(12) United States Patent
Linn et al.

(10) Patent No.: US 11,314,498 B2
(45) Date of Patent: Apr. 26, 2022

(54) SYSTEM AND METHOD FOR DOWNGRADING APPLICATIONS

(71) Applicant: Apple Inc., Cupertino, CA (US)

(72) Inventors: Christopher S. Linn, Palo Alto, CA (US); Eric S. Brown, Los Altos, CA (US); Eric O. Carlson, Mountain View, CA (US); Cindy M. Barrett, Menlo Park, CA (US); Jonathan M. Grynspan, Santa Clara, CA (US); Donald M. Firlik, Cupertino, CA (US); Cameron S. Birse, San Jose, CA (US); Timothee Geoghegan, San Francisco, CA (US)

(73) Assignee: Apple Inc.

( * ) Notice: Subject to any disclaimer, the term of this patent is extended or adjusted under 35 U.S.C. 154(b) by 0 days.

(21) Appl. No.: 16/226,259

(22) Filed: Dec. 19, 2018

(65) Prior Publication Data

US 2019/0187974 A1    Jun. 20, 2019

Related U.S. Application Data

(63) Continuation of application No. 14/866,816, filed on Sep. 25, 2015, now Pat. No. 10,235,152.

(60) Provisional application No. 62/171,969, filed on Jun. 5, 2015.

(51) Int. Cl.
*G06F 8/65* (2018.01)
*G06F 8/61* (2018.01)

(52) U.S. Cl.
CPC . *G06F 8/65* (2013.01); *G06F 8/62* (2013.01)

(58) Field of Classification Search
CPC .............. G06F 3/0482; G06F 11/1469; G06F 11/1458; G06F 3/04817; G06F 17/30117; G06F 3/0608; G06F 8/62; G06F 8/65; G06F 21/6218; G06F 16/9535; G06F 8/61; G06F 8/60
See application file for complete search history.

(56) References Cited

U.S. PATENT DOCUMENTS

| | | |
|---|---|---|
| 7,710,912 B1 | 5/2010 | Myles et al. |
| 8,965,958 B2 | 2/2015 | Myerscough et al. |
| 9,086,937 B2 | 7/2015 | Arrouye et al. |
| 2004/0254975 A1 | 12/2004 | Teh et al. |
| 2006/0048139 A1* | 3/2006 | Nakamura ................ G06F 8/62 717/174 |
| 2009/0320017 A1 | 12/2009 | Jackson et al. |

(Continued)

OTHER PUBLICATIONS

Anushruti Vagrani et al.; Decline in Mobile Application Life Cycle; ITQM; pp. 957-964; retrieved on Nov. 12, 2021 (Year: 2017).*

(Continued)

*Primary Examiner* — S. Sough
*Assistant Examiner* — Cuong V Luu
(74) *Attorney, Agent, or Firm* — Dickinson Wright RLLP

(57) ABSTRACT

Disclosed herein is a technique for downgrading applications to placeholder applications in order to free up storage space in a user device. Based on a variety of heuristics, a number of installed applications are identified as candidates for a downgrade. The downgrading of the identified applications involves creating a placeholder application for each of the identified applications. The identified applications are temporarily deleted while keeping the user data associated with the applications intact and the placeholder applications are installed.

20 Claims, 5 Drawing Sheets

(56) References Cited

U.S. PATENT DOCUMENTS

| | | | |
|---|---|---|---|
| 2011/0016089 A1 | 1/2011 | Freedman et al. | |
| 2011/0202912 A1 | 8/2011 | Itoh | |
| 2012/0096455 A1 | 4/2012 | Katsumata et al. | |
| 2013/0110903 A1 | 5/2013 | Myerscough et al. | |
| 2013/0311986 A1 | 11/2013 | Arrouye et al. | |
| 2013/0325809 A1 | 12/2013 | Kim et al. | |
| 2014/0075430 A1* | 3/2014 | Zheng | G06F 8/62 717/174 |
| 2014/0245286 A1 | 8/2014 | Wong et al. | |
| 2016/0026534 A1* | 1/2016 | Ru | G06F 11/1448 707/652 |
| 2016/0357545 A1 | 12/2016 | Linn et al. | |
| 2018/0260206 A1* | 9/2018 | Pandey | G06F 11/1451 |

OTHER PUBLICATIONS

Chris Tucker et al.; OPIUM Optimal Package Install/Uninstall Manager; IEEE; 10 pages; retrieved on Nov. 12, 2021 (Year: 2007).*

Guy Clapperton; Understanding Online Backup; PC Network advisor, pp. 15-19; <https://www.techsupportalert.com/pdf/r1833.pdf>; retrieved on Oct. 16, 2018 (Year: 2000).

Kris Harms; Forensic analysis of System Restore points in Microsoft Windows XP; Elsevier; pp. 151-158; <https://www.sciencedirect.com/science/article/pii/S 17 42287606000971 >; retrieved on Oct. 16, 2018 (Year: 2006).

Nguyen Tran et al.; Efficient Cooperative Backup with Decentralized Trust Management; ACM; 25 pages; <https://dl.acm.org/citation.cfm?id=2339119>; retrieved on Oct. 16, 2018 (Year: 2012).

Yan-Kit Li, et al.; Efficient Hybrid Inline and Out-of-Line Deduplication for Backup Storage; ACM; 21 pages; <https://dl.acm.org/citation.cfm?id=2641572>; retrieved on Oct. 16, 2018 (Year: 2014).

Avishay Traeger et al.; Using Free Web Storage for Data Backup; ACM; pp. 73-77; <https://dl.acm.org/citation.cfm?id=117957 4>; retrieved on Oct. 16, 2018 (Year: 2006).

Houssem Jarraya et al.; A Secure Peer-to-Peer Backup System; ACM; pp. 130-139; <https://dl.acm.org/citation.cfm?id=1416751 >; retrieved on Oct. 16, 2018 (Year: 2008).

* cited by examiner

SYSTEM AND METHOD FOR DOWNGRADING APPLICATIONS

CROSS-REFERENCE TO RELATED APPLICATIONS

The present application is a continuation of U.S. application Ser. No. 14/866,816, filed Sep. 25, 2015, entitled "SYSTEM AND METHOD FOR DOWNGRADING APPLICATIONS," set to issue Mar. 19, 2019 as U.S. Pat. No. 10,235,152, which claims the benefit of U.S. Provisional Application No. 62/171,969, entitled "SYSTEM AND METHOD FOR DOWNGRADING APPLICATIONS," filed Jun. 5, 2015, the contents of which are incorporated herein by reference in their entirety for all purposes.

FIELD

The described embodiments set forth a technique for downgrading an application to a placeholder application in order to free up space on a user device.

BACKGROUND

Generally, users tend to load their devices with large amounts of data (e.g., music, pictures, movie, etc.). At some point, there may not be enough storage space remaining in a user device to allow additional data to be loaded or processes requiring additional space (e.g., software updates) to be performed. As a result, critical updates cannot be performed on the user device, which can degrade the performance of the user device and the user's overall satisfaction with the process. Consequently, there is a need for a system that is capable of freeing up storage space in a manner that is transparent to the user while promoting the best user experience possible.

SUMMARY

Representative embodiments set forth herein disclose various techniques for downgrading applications to placeholder applications in order to free up storage space in a user device. When sufficient storage space does not exist for a particular process (e.g., a software update) to be performed on the user device, 1) a number of applications that can be downgraded are identified, and 2) the identified applications are downgraded and temporarily deleted. The downgrading of the identified applications involves creating a placeholder application for each of the identified applications. More specifically, the placeholder application includes files that represent the corresponding identified application, however, the placeholder application occupies less storage space on the user device (in comparison to the complete application). According to some embodiments, the identified applications are temporarily deleted, but the user data associated with the applications remains intact while the placeholder applications are installed. Because the placeholder applications occupy less storage space in comparison to the identified applications, sufficient storage space can be freed up for the particular process to be performed.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for freeing up storage space in a user device by downgrading applications, which involves temporarily deleting application bundles associated with applications that are candidates for a downgrade without deleting the user data associated with the applications. An application bundle can include an executable application and/or resources that are associated with the application. According to some embodiments, a variety of heuristics (e.g., historical use of the application, size of the application, etc.) are utilized to identify applications that can be downgraded. The application bundles associated with the identified applications are deleted while minimizing the risk of destroying the user data associated with the identified applications.

Accordingly, the techniques described herein provide a mechanism for downgrading and temporarily deleting applications in order to free up storage space in the user device in a manner that is transparent to a user of the user device. A more detailed discussion of these techniques is set forth below and described in conjunction with FIGS. 1-5, which illustrate detailed diagrams of systems and methods that can be used to implement these techniques.

Figure 1:
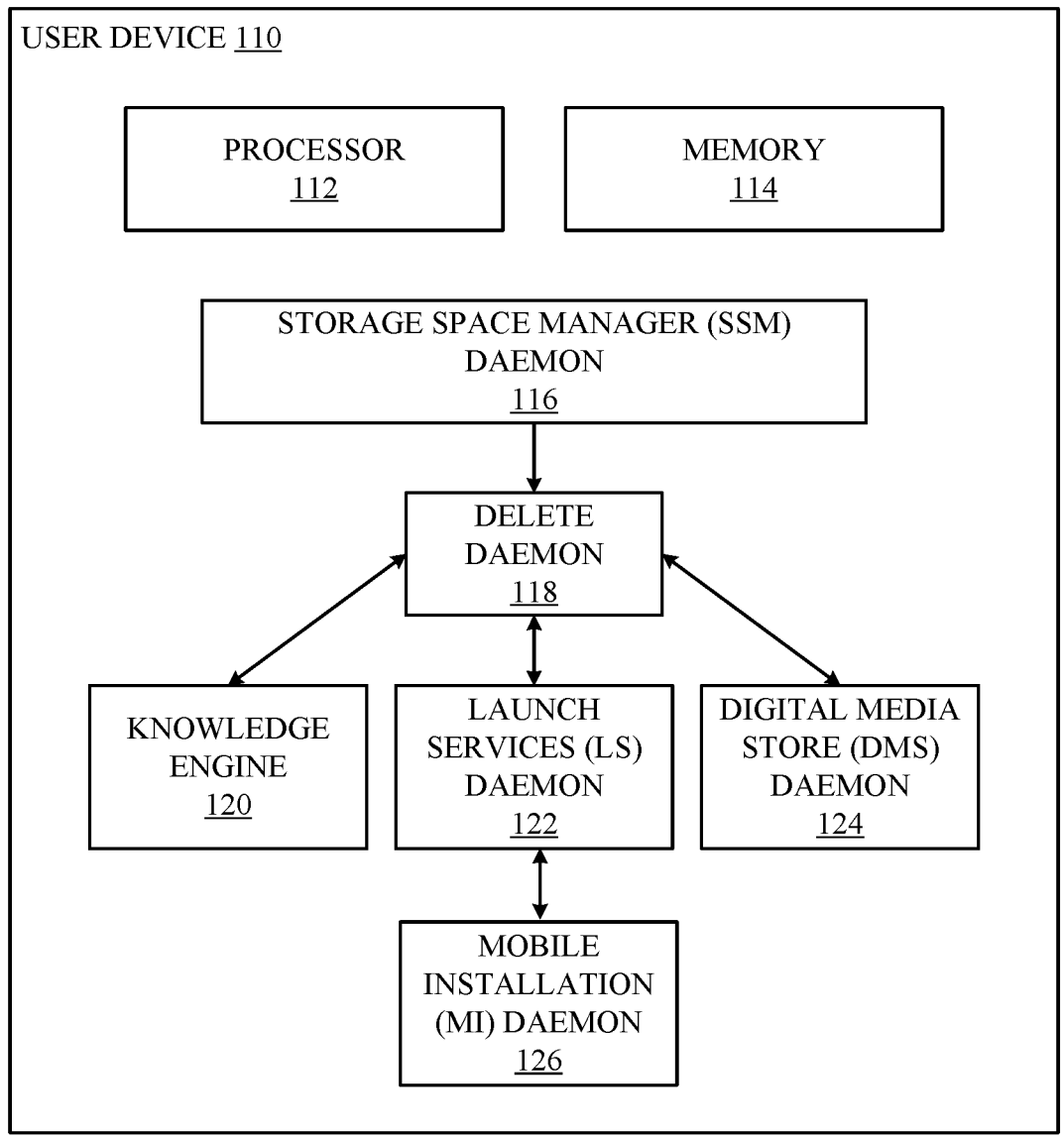
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a device having limited file storage capacity such as a mobile computing device (e.g., an iPhone®, an iPad®). A processor 112, in conjunction with the memory 114, can implement an operating system (OS) that is configured to execute various applications (e.g., native OS applications and user applications), daemons, and other processes/services on the user device 110. Daemons include processes that run as a background process rather than under direct control of the user of the user device 110. A file system in the OS (not otherwise illustrated in FIG. 1) handles the storage of data files, applications, and files associated with the OS.

As shown in FIG. 1, the user device 110 can include a storage space manager (SSM) daemon 116, a delete daemon 118, a knowledge engine 120, a launch services (LS) daemon 122, a digital media store (DMS) daemon 124, and a mobile installation (MI) daemon 126. The SSM daemon 116 represents a process that requires additional storage space or needs to free up additional storage space in the user device 110. For example, the SSM daemon 116 can represent a software update process, a backup restore process, or any other process that that requires additional storage space for the process to be performed. The software update process can include an OS (e.g., iOS or other operating system) upgrade.

As shown in FIG. 1, the knowledge engine 120 represents a system that gathers information from the user device 110 in order to make predictions about a future behavior of the user device 110 (e.g., applications that will be launched by the user, behavior pertaining to power management, etc.). In particular, the knowledge engine 120 develops a model based on historical use of the user device 110. The knowledge engine 120 tracks the user's behavior (e.g., which applications are launched and when) and learns how the user device 110 is used over time. The knowledge engine 120 then constructs, based on the user's behavior/use of the device, a statistical model of how likely is it for a particular application to be launched over a period of time. The model can also be used to predict a good time to perform a particular task (e.g., the software update).

According to one embodiment, based on information from the knowledge engine 120, the delete daemon 118 constructs a list of applications that can be downgraded and/or temporarily deleted. The delete daemon 118 also receives, from the DMS daemon 124, information regarding applications in the list that are recoverable (i.e., can be re-downloaded) from a digital media store (e.g., iTunes® by Apple®). The DMS daemon 124 interacts with the digital media store in order to determine the recoverable applications.

As shown in FIG. 1, the LS daemon 122 keeps track of applications that are installed on the user device 110. The LS daemon 122 tracks what types of applications are installed on the user device 110 and/or the size of the installed applications. For example, the installed applications can include system applications, downloaded applications that are downloaded from the digital media store, etc. The MI daemon 126 handles the management of the installed applications and associated user data, and the installation of placeholder applications and/or any temporarily deleted applications.

Figure 2:
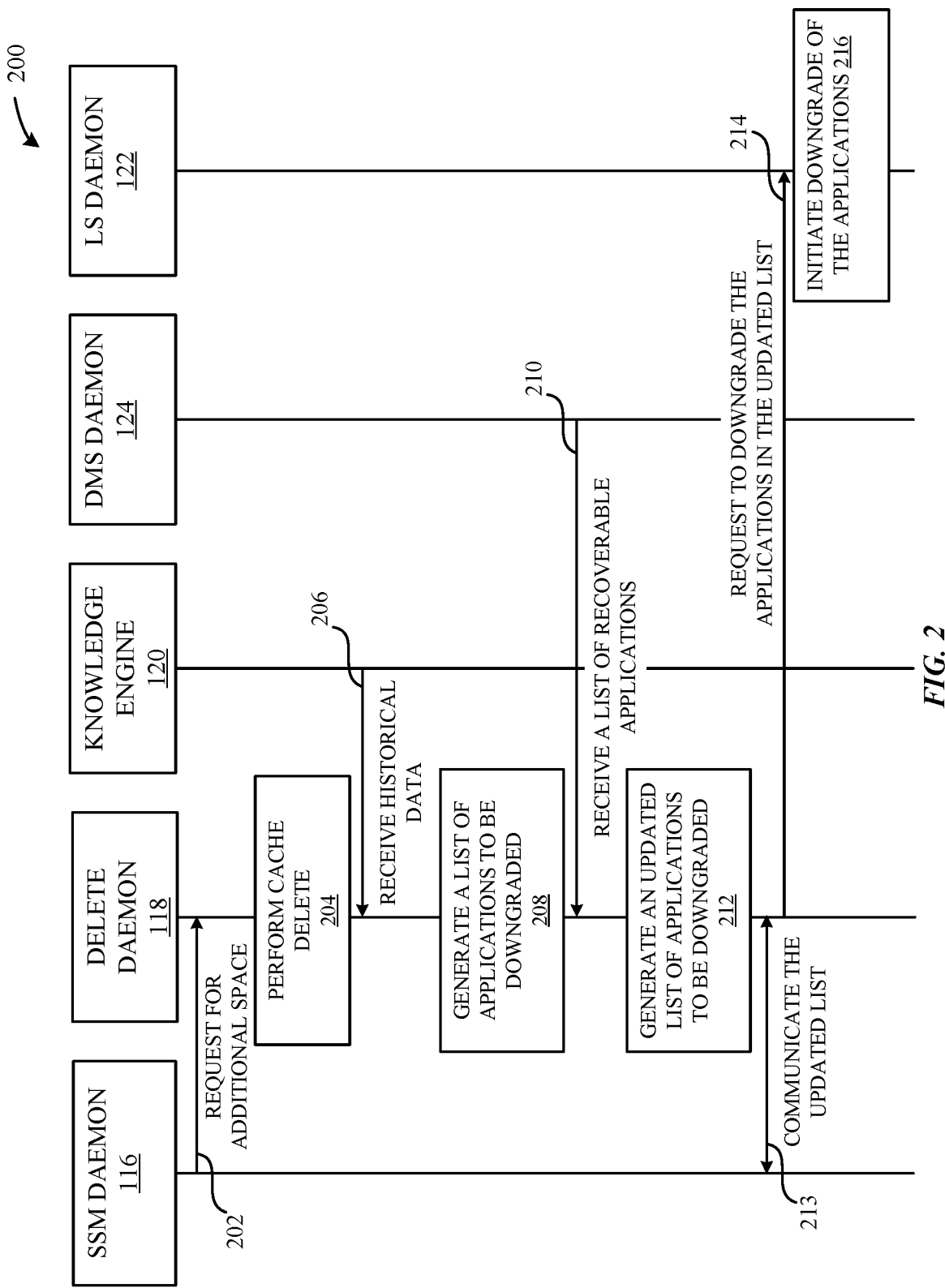
FIG. 2 illustrates a sequence diagram of a method for downgrading applications that is performed by various components of a user device of FIG. 1, according to some embodiments.

FIG. 2 illustrates a sequence diagram of a method 200 for downgrading applications that is performed by various components of the user device 110, according to some embodiments. As shown in FIG. 2, at step 202, the SSM daemon 116 communicates a request for additional storage space to the delete daemon 118. According to one embodiment, when the SSM daemon 116 represents a software update process, the SSM daemon 116 determines that an update applicable for the user device 110 is available. The SSM daemon 116 computes space requirements for the software update. When sufficient storage space is not available for the software update, the SSM daemon 116 communicates the request for additional storage space to the delete daemon 118. The request can include a total amount of storage space required for the software update process.

At step 204, the delete daemon 118 deletes cached data associated with applications/processes on the user device 110 in response to the request. The delete daemon 118 also deletes cached files associated with the digital media store (e.g., Application cached files), and requests other subsystems to purge cached data (e.g., iTunes Match cached files). The cached data includes data that can be deleted without posing a significant risk to the functioning of the user device 110. After the cached data is deleted, the SSM daemon 116 determines whether additional storage space is required for the software update process (e.g., because the required total amount of storage space has not been met). When additional storage space needs to be freed, the SSM daemon 116 determines that application downgrading needs to be performed to make additional storage space.

At step 206, the delete daemon 118 receives historical data from the knowledge engine 120. The historical data includes data regarding the historical use of the device. The historical data can include a variety of heuristics that vary depending on the OS version associated with the user device 110 on which the software update process is being performed. For example, the historical data can include information regarding applications that the user has launched over a period of time and when the applications were launched. According to an embodiment, the delete daemon 118 requests/queries the knowledge engine 120 to provide the historical data when application downgrading needs to be performed.

At step 208, the delete daemon 118 identifies applications that can be downgraded based on the historical data. In particular, the delete daemon 118 generates a list of applications to be downgraded based on the historical data. For example, the list of applications can include applications that have not been used/launched by the user for a particular period of time (e.g., 1-3 weeks) or are seldom used by the user. According to some embodiments, the list of applications to be downgraded is returned to the SSM daemon 116, which can identify applications that the user has used recently and remove those applications from the list.

According to some embodiments, the delete daemon 118 identifies applications that can be downgraded based on the size of the applications in addition to the historical data. The applications in the list are sorted based on the least recently used application and weighted by the size of the application. By downgrading and temporarily deleting the larger applications first, storage space can be made available sooner; however, any large applications that have been recently used by the user are not deleted as doing so will negatively impact user experience. In some implementations, the delete daemon 118 obtains an initial list of installed applications from the LS daemon 122 in addition to the size of the applications. The delete daemon 118 can update the initial list to generate the list of applications to be the downgraded. For example, the delete daemon 118 can remove, from the initial list, any applications that the user has recently used and keep the applications that the user has not used over a period of time.

At step 210, the delete daemon 118 receives a list of recoverable applications from the DMS daemon 124. In particular, the delete daemon 118 first constructs a list of applications to be downgraded based on information from the knowledge engine 120 and then consults the DMS daemon 124 to ensure that each application in the list is recoverable from the digital media store. Once the delete daemon 118 receives the list of recoverable applications, the delete daemon 118 generates an updated list of applications to be downgraded, at step 212.

At step 213, the delete daemon 118 returns the updated list of applications to the SSM daemon 116. The SSM daemon 116 filters the updated list of applications. In particular, the SSM daemon 116 identifies applications that can be removed from the list. For example, if a particular application is not recoverable from the digital media store, the particular application is removed from the list of applications to be downgraded such that the updated list does not include the particular application. As such, the updated list includes applications that have not been used by the user for a particular period of time and are recoverable from the digital media store. After possible trimming of the updated list, the SSM daemon 116 sends the updated list back to the delete daemon 118.

At step 214, the delete daemon 118 instructs the LS daemon 122 to downgrade each application in the updated list. The delete daemon 118 communicates a request to downgrade the applications in the updated list to the LS daemon 122. In turn, the LS daemon 122 initiates a downgrade of each application in the updated list in response to the request, at step 216.

According to some embodiments, the downgrading of the applications in the updated list involves creating a placeholder application or placeholder bundle for each application in the updated list. The placeholder application includes a set of files that are needed to represent the corresponding application without producing a usable application. The set of files can include a file containing configuration data associated with the application, a file containing localization information associated with the application, and a copy of the application icon. In other words, the placeholder application is a shell of the corresponding application in the updated list.

According to some embodiments, the LS daemon 122 selects the set of files that are needed to create each placeholder application, preserves the set of files, and copies the set of files to a temporary storage location. After creating the placeholder applications, LS daemon 122 instructs the MI daemon 126 to perform a number of operations for downgrading the applications in the updated list. For each application in the updated list, the MI daemon 126 associates the user data with the corresponding placeholder application in order to preserve the user data. The MI daemon 126 replaces each application in the updated list with the corresponding placeholder application. In particular, the MI daemon 126 deletes each application in the updated list and installs the corresponding placeholder application where the set of files associated with the placeholder application are copied from the temporary storage location to a storage location of the deleted application. In some embodiments, deleting the application involves deleting the application bundle that contains the executable binary code and/or resources (e.g., resources provided by a developer) associated with the application. In some embodiments, the process of downgrading and/or temporarily deleting of the applications and replacing the applications with the placeholder applications is invisible and transparent to the user as the process is performed during the software update.

According to some embodiments, the placeholder application represents the corresponding application on the user device 110 in the form of an application icon on a user interface (UI) presented on the user device 110. A number of UI interface elements can be utilized to provide a visual indication to the user that the corresponding application is not currently available/accessible (because it is in the process of being downgraded/deleted while the software update is being performed). In some embodiments, the user device 110 remains functional during the software update process so the visual indication specifies that the corresponding application is present (i.e., in the form of the placeholder application) albeit in a state that is not immediately accessible. For example, the application icon associated with the corresponding application that is being or is downgraded is present in the UI and can be grayed out to provide a visual indication to the user that the application is not accessible by the user. In some embodiments, a "waiting" message can be placed next to or over the icon to provide the visual indication. Other user interface elements can be utilized to present the visual indication to the user without departing from the scope of the disclosure. In some embodiments, appearance of the application icon can remain unchanged but the user can be presented with a message that the application is not accessible when the user selects the application icon.

According to some embodiments, after the software update process is completed successfully (e.g., the OS of the user device 110 is upgraded to a new version), the DMS daemon 124 re-downloads all the downgraded/deleted applications (i.e., applications for which the placeholder applications were created) from the digital media store. The LS daemon 122 identifies the re-downloaded applications and instructs the MI daemon 126 to re-associate the user data with the re-downloaded applications. When the user data is re-associated, the MI daemon 126 deletes the placeholder applications and installs the re-downloaded applications. In this manner, the creation of the placeholder applications and the deletion of the applications associated with the placeholder applications are carried out temporarily to make additional storage space available for the software update process. But, when the software update process is completed, the original applications are restored from the digital media store and are made available to the user. In other words, the applications are immediately ready for use because the user data is kept intact during the software update process and is re-associated with the applications when the applications are re-installed. In some embodiments, while the applications are being re-downloaded and re-installed, the grayed out application icon is presented with a progress indicator (e.g., a progress circle) indicating a status of the re-download/re-install. When the install is complete, the real application icon (i.e., non-grayed out icon) can be presented to the user to indicate that the application is now available for use.

In some embodiments, the DMS daemon 124 includes a data migrator process that is capable of running a number of plug-ins where each plug-in recognizes a particular domain of data on the user device 110 and migrates it to a new format understood by the new version of the OS. The data migrator process iterates through the installed applications as advertised by the LS daemon 122 and identifies a number of applications that are marked as downgraded applications. For each of the identified applications, the DMS daemon 124 restores/re-downloads the applications from the digital media store. In some embodiments, the DMS daemon 124 re-downloads the latest version of the applications that supports the new OS version that the user device 110 is executing after the software update process. According to some implementations, the data migrator process can represent a separate system component/daemon that is not part of the DMS daemon 124.

In some embodiments, the LS daemon 122 keeps track of applications that are downgraded. In some embodiments, the LS daemon 122 maintains a list of downgraded applications to track the applications that are downgraded. In some other embodiments, the file system keeps track of applications that are downgraded. In particular, a bit is set in the metadata of the file system associated with a particular application to mark the particular application as a downgraded application. In some implementations, the LS daemon 122 can provide information regarding applications that are downgraded based on the metadata of the file system.

In some cases, the DMS daemon 124 may not be able to restore a particular application because the particular application is removed from the digital media store (e.g., due to legal requirements). For example, the DMS daemon 124 may have indicated that the particular application is recoverable (e.g., at step 210 of FIG. 2) but by the time the software update was completed, the particular application was removed from the digital media store and may not recoverable any more. According to some embodiments, to obviate user dissatisfaction at not being able to recover the particular application, the user may be presented with an option to select applications that the user wants to downgrade from the updated list generated at the step 212 of FIG. 2. The user can be presented with an indication (via a UI) that the applications in the updated list are going to be downgraded/deleted and inaccessible for a particular period of time (e.g., during the software update process). The user can further be prompted to acknowledge and provide approval for the software update process and/or the downgrading of application where the delete daemon 118 can allow the user to select the applications to be downgraded. The delete daemon 118 can then request the LS daemon 122 to initiate the downgrade of the selected applications.

According to some embodiments, the restoration of the applications can be triggered prior to the completion of the software update process. For example, when a user tries to launch an application that is downgraded/deleted (i.e., by tapping/selecting the grayed out icon associated with the application in the UI), the restoration of the application can be prioritized. In some embodiments, the application can be re-downloaded instantly and made available for the user. In some embodiments, the user can be presented with a message (via a pop-up, for example) that states that the application has to be or is being downloaded. In some other embodiments, the user can be presented with a message that states that the application has been temporarily removed in order to allow the user to update the software, and that the user can try accessing the application at a later time.

According to some embodiments, rather than deleting the applications that are identified as candidates for downgrade, the data associated with the application (e.g., the application bundle) can be compressed in-place on the user device 110. In some other embodiments, rather than deleting the applications and re-downloading them from the digital media store, the applications can be uploaded to and re-downloaded from a backup storage system (e.g., iCloud storage by Apple®).

While FIG. 2 has been described from the perspective of a software update process, it will be appreciated that the components interact with one another in a similar manner to free up storage space for any other process that requires additional storage space in the user device 110.

Figure 3:
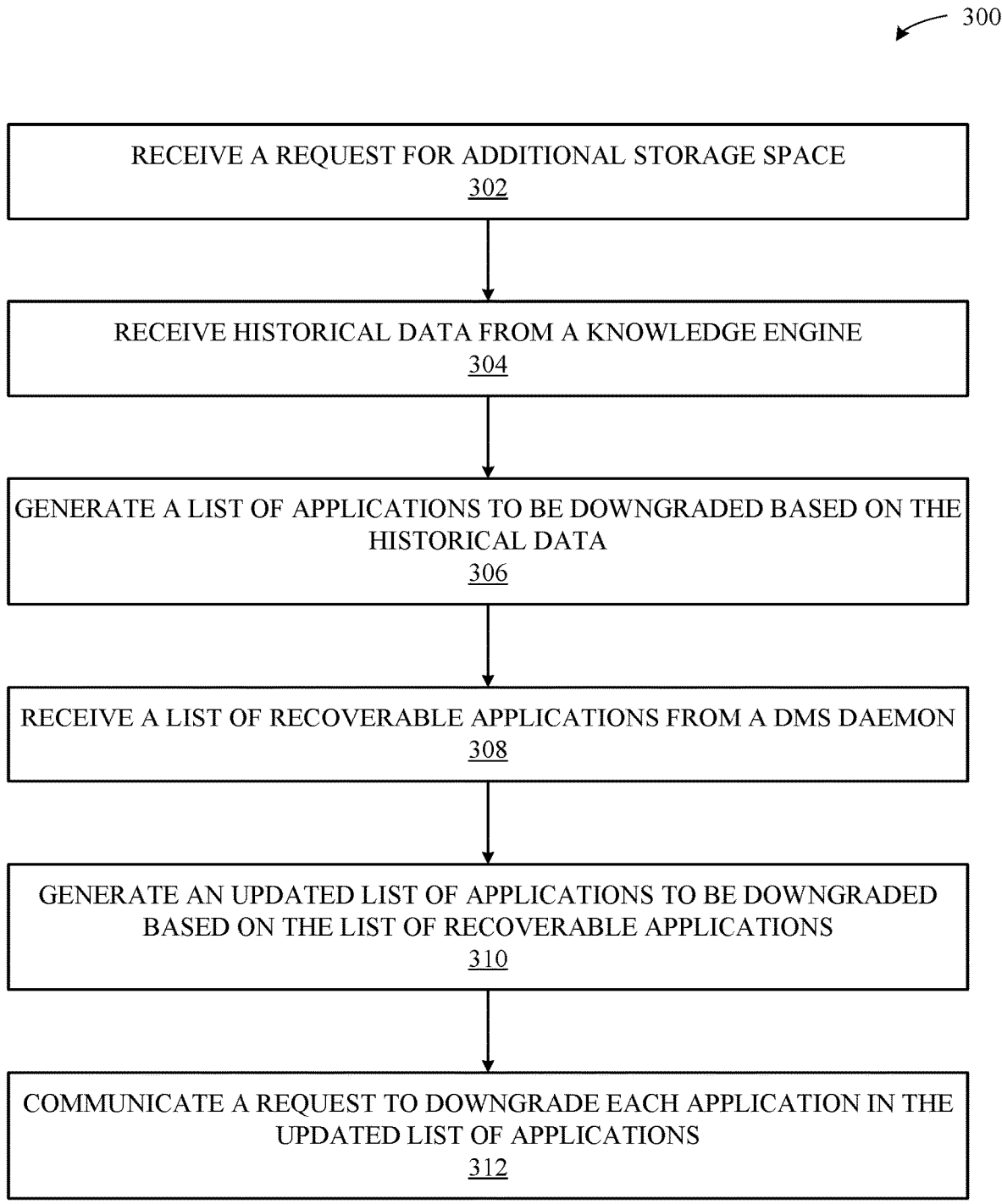
FIG. 3 illustrates a method that is carried out by a delete daemon implemented by the user device of FIG. 1, according to one embodiment.

FIG. 3 illustrates a method 300 that is carried out by the delete daemon 118 implemented by the user device 110 of FIG. 1, according to one embodiment. As shown, the method 300 begins at step 302, where the delete daemon 118 receives a request for additional storage space (from the SSM daemon 116, for example). At step 304, the delete daemon 118 receives historical data associated with applications installed on the user device 110 from the knowledge engine 120. For example, the historical data can include information regarding applications that have been launched and when. Based on the historical data and/or size of the applications, the delete daemon 118 generates a list of applications to be downgraded, at step 306. For example, any applications that have not been launched for a particular period of time can be included in the list of applications to be downgraded.

At step 308, the delete daemon 118 receives a list of recoverable applications (from the DMS daemon 124, for example). At step 310, the delete daemon 118 generates an updated list of applications to be downgraded based on the list of recoverable applications. For example, updated list of applications can indicate whether the applications are recoverable and/or not recoverable from the digital media store. According to some embodiments, the delete daemon 118 can communicate the updated list to the SSM daemon 116, which can identify applications that can be removed from the list. For example, applications that are not recoverable from the digital media store can be removed from the updated list. At step 312, the delete daemon 118 communicates a request to downgrade each application in the updated list of applications to the LS daemon 122. The LS daemon 122, in turn, initiates a downgrade of each application in the updated list in response to the request.

Figure 4:
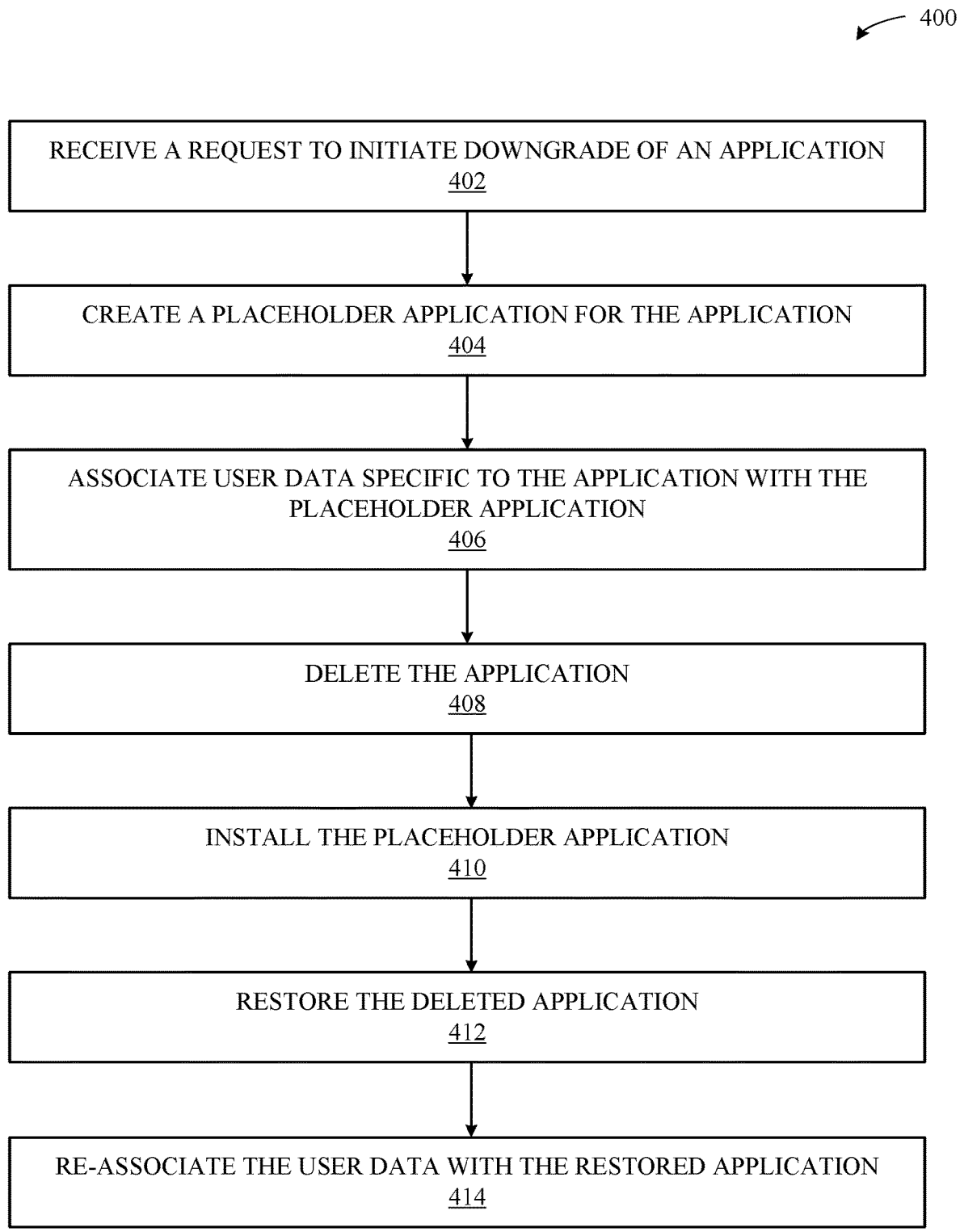
FIG. 4 illustrates a method for downgrading and restoring applications that is carried out by various components implemented by the user device of FIG. 1, according to one embodiment.

FIG. 4 illustrates a method 400 for downgrading and restoring applications that is carried out by various components implemented by the user device 110 of FIG. 1, according to one embodiment. As shown, the method 400 begins at step 402, where the LS daemon 122 receives a request to initiate a downgrade of an application (from the delete daemon 118, for example). According to one embodiment, the application is selected as a candidate for the downgrade because the SSM daemon 116 indicates that additional storage space is needed for a particular process to be performed. In response to the request, the LS daemon 122 creates a placeholder application for the application, at step 404. The placeholder application includes a set of files that are needed to represent the application (e.g., configuration files, localization files, application icon, etc.) and requires less storage space than the application.

At step 406, the MI daemon 126 (as directed by the LS daemon 122) associates user data specific to the application with the placeholder application to ensure that the user data is not destroyed during the downgrading/deleting process. At step 408, the MI daemon 126 deletes the application. In particular, the MI daemon 126 deletes the application bundle that includes the binary code and/or resources associated with the application. At step 410, the MI daemon 126 installs the placeholder application and the user is presented with a grayed out application icon indicating that the application is not accessible.

At step 412, the DMS daemon 124 restores the deleted application (i.e., re-downloads the deleted application from the digital media store. According to some embodiments, the restoration is performed after the particular process has been successfully completed. At step 414, the MI daemon 126 re-associates the user data with the restored application.

While various embodiments have been described for user devices having limited file storage capacity because storage space is generally more restricted on such devices and these devices are more constrained in terms of CPU and battery power resources, it will be appreciated that the embodiments described herein can be used for other types of devices, for example desktop computers, laptop computers, or other computing devices.

Figure 5:
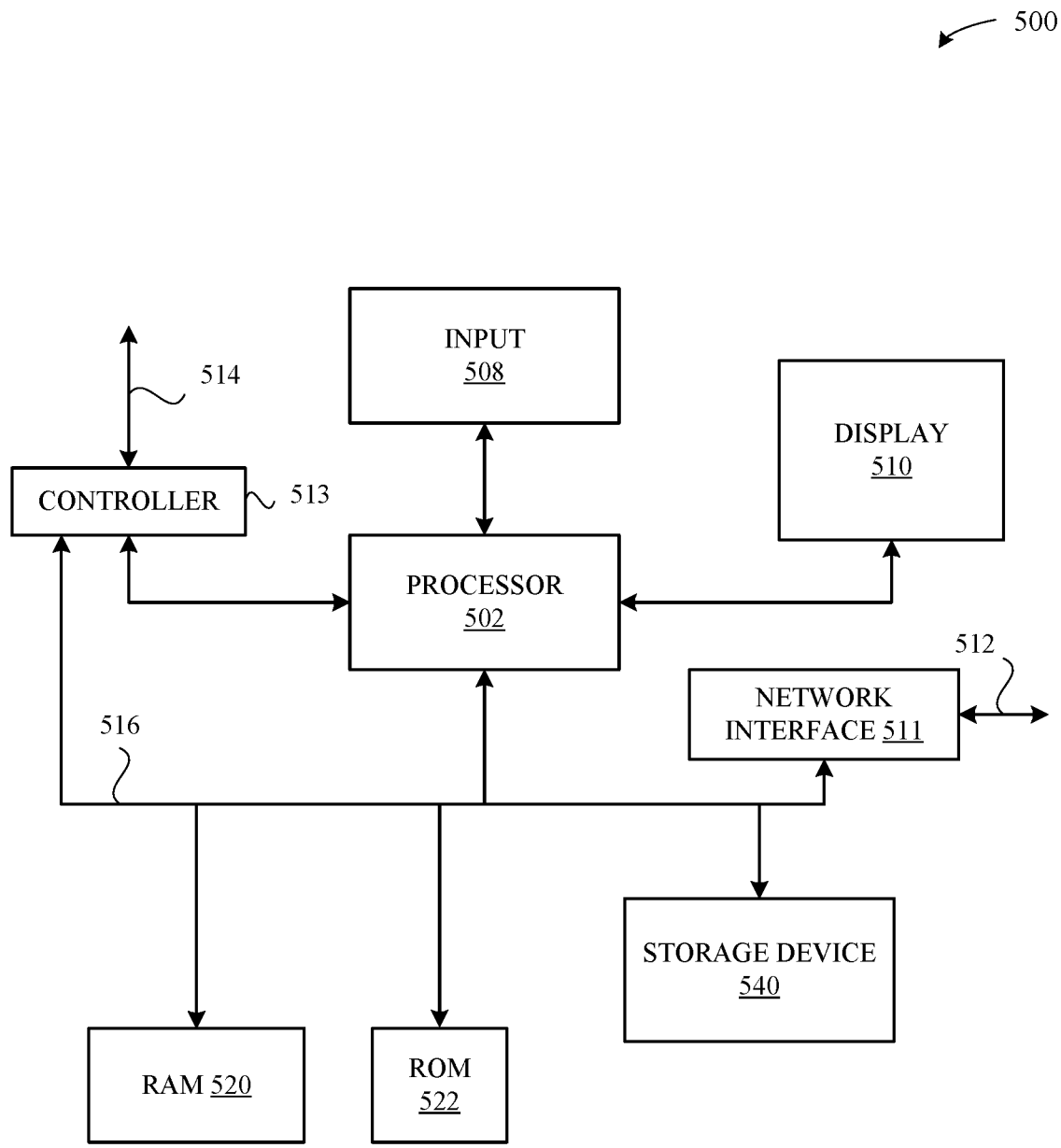
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the user device 110 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user (for example, email interface described herein). A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing available storage space on a computing device, the method comprising, at the computing device:
identifying a first condition to downgrade a plurality of applications to a plurality of placeholder applications;
for each application of the plurality of applications:
creating a respective placeholder application for the application,
storing, with the respective placeholder application, user data that is specific to the application, and
deleting the application from the computing device;
identifying a second condition to restore the plurality of placeholder applications to the plurality of applications; and
in response to identifying, while restoring the plurality of placeholder applications, a selection of an icon representative of a particular placeholder application of the plurality of placeholder applications:
prioritizing a restoration of the particular placeholder application to a respective application,
re-associating the user data with the respective application, and
launching the respective application.

2. The method of claim 1, wherein each application of the plurality of applications is categorized as a recoverable application when the application can be downloaded onto the computing device through a digital media store.

3. The method of claim 1, wherein, for a given application of the plurality of applications, the respective placeholder application includes configuration data and localization information associated with the given application.

4. The method of claim 1, wherein deleting a given application of the plurality of applications from the computing device comprises:
deleting a respective application bundle associated with the given application from a non-volatile memory of the computing device.

5. The method of claim 4, wherein, for the given application, the respective application bundle comprises executable code associated with the given application or one or more resources associated with the given application.

6. The method of claim 1, wherein the icon representative of the particular placeholder application is grayed out to provide a visual indication that the respective application that corresponds to the particular placeholder application has been deleted.

7. The method of claim 1, wherein the first condition occurs when an amount of available storage space satisfies a threshold.

8. At least one non-transitory computer readable storage medium storing instructions that, when executed by at least one processor included in a computing device, cause the computing device to manage available storage space on the computing device, by carrying out steps that include:
identifying a first condition to downgrade a plurality of applications to a plurality of placeholder applications;
for each application of the plurality of applications:
creating a respective placeholder application for the application,
storing, with the respective placeholder application, user data that is specific to the application, and
deleting the application from the computing device;
identifying a second condition to restore the plurality of placeholder applications to the plurality of applications; and
in response to identifying, while restoring the plurality of placeholder applications, a selection of an icon representative of a particular placeholder application of the plurality of placeholder applications:
prioritizing a restoration of the particular placeholder application to a respective application,
re-associating the user data with the respective application, and
launching the respective application.

9. The at least one non-transitory computer readable storage medium of claim 8, wherein each application of the plurality of applications is categorized as a recoverable application when the application can be downloaded onto the computing device through a digital media store.

10. The at least one non-transitory computer readable storage medium of claim 8, wherein, for a given application of the plurality of applications, the respective placeholder application includes configuration data and localization information associated with the given application.

11. The at least one non-transitory computer readable storage medium of claim 8, wherein deleting a given application of the plurality of applications from the computing device comprises:
deleting a respective application bundle associated with the given application from a non-volatile memory of the computing device.

12. The at least one non-transitory computer readable storage medium of claim 11, wherein, for the given application, the respective application bundle comprises executable code associated with the given application or one or more resources associated with the given application.

13. The at least one non-transitory computer readable storage medium of claim 8, wherein the icon representative of the particular placeholder application is grayed out to provide a visual indication that the respective application that corresponds to the particular placeholder application has been deleted.

14. The at least one non-transitory computer readable storage medium of claim 8, wherein the first condition occurs when an amount of available storage space satisfies a threshold.

15. A computing device configured to manage available storage space on the computing device, the computing device comprising:
at least one processor; and
at least one memory storing instructions that, when executed by the at least one processor, cause the computing device to:
identify a first condition to downgrade a plurality of applications to a plurality of placeholder applications;
for each application of the plurality of applications:
create a respective placeholder application for the application,
store, with the respective placeholder application, user data that is specific to the application, and
delete the application from the computing device;
identify a second condition to restore the plurality of placeholder applications to the plurality of applications; and
in response to identifying, while restoring the plurality of placeholder applications, a selection of an icon representative of a particular placeholder application of the plurality of placeholder applications:
prioritize a restoration of the particular placeholder application to a respective application,
re-associate the user data with the respective application, and
launch the respective application.

16. The computing device of claim 15, wherein each application of the plurality of applications is categorized as a recoverable application when the application can be downloaded onto the computing device through a digital media store.

17. The computing device of claim 15, wherein, for a given application of the plurality of applications, the respective placeholder application includes configuration data and localization information associated with the given application.

18. The computing device of claim 15, wherein deleting a given application of the plurality of applications from the computing device comprises:
deleting a respective application bundle associated with the given application from a non-volatile memory of the computing device.

19. The computing device of claim 18, wherein, for the given application, the respective application bundle comprises executable code associated with the given application or one or more resources associated with the given application.

20. The computing device of claim 15, wherein the icon representative of the particular placeholder application is grayed out to provide a visual indication that the respective application that corresponds to the particular placeholder application has been deleted.

* * * * *